(12) United States Patent
Lehmann

(10) Patent No.: US 11,441,928 B2
(45) Date of Patent: Sep. 13, 2022

(54) METHOD FOR TESTING A SENSOR

(71) Applicant: Continental Teves AG & Co. oHG, Frankfurt am Main (DE)

(72) Inventor: Sören Lehmann, Frankfurt am Main (DE)

(73) Assignee: Continental Teves AG & Co. oHG

( * ) Notice: Subject to any disclaimer, the term of this patent is extended or adjusted under 35 U.S.C. 154(b) by 0 days.

(21) Appl. No.: 17/268,492

(22) PCT Filed: Aug. 12, 2019

(86) PCT No.: PCT/EP2019/071625
§ 371 (c)(1),
(2) Date: Feb. 15, 2021

(87) PCT Pub. No.: WO2020/035463
PCT Pub. Date: Feb. 20, 2020

(65) Prior Publication Data
US 2021/0310837 A1 Oct. 7, 2021

(30) Foreign Application Priority Data
Aug. 15, 2018 (DE) ...................... 10 2018 213 725.0

(51) Int. Cl.
*G01D 18/00* (2006.01)
*G01D 5/22* (2006.01)

(52) U.S. Cl.
CPC ........... *G01D 18/00* (2013.01); *G01D 5/2266* (2013.01); *G01D 2218/10* (2021.05)

(58) Field of Classification Search
None
See application file for complete search history.

(56) References Cited

U.S. PATENT DOCUMENTS 5,767,670 A 6/1998 Maher et al.
7,138,794 B1 11/2006 Cook et al.
(Continued)

FOREIGN PATENT DOCUMENTS

DE 102013019168 A1 2/2015
EP 2707731 A2 * 3/2014 ........... G01D 5/2291
(Continued)

OTHER PUBLICATIONS

Gochis George, Position sensor with failure detector, Feb. 28, 1979 (Year: 1980).*
(Continued)

*Primary Examiner* — Raul J Rios Russo
*Assistant Examiner* — Carl F. R. Tchatchouang
(74) *Attorney, Agent, or Firm* — RatnerPrestia

(57) ABSTRACT

A method for testing a sensor with a primary inductor which is galvanically isolated from first and second secondary inductors which are respectively coupled inductively to the primary inductor, including: calculating a sensor output signal, wherein the sensor output signal is dependent on the coupling between the primary inductor and the first secondary inductor as well as that between the primary inductor and the second secondary inductor; determining a first electrical variable, which is different from the sensor output signal; comparing the first electrical variable with a first limiting value in order to determine whether the sensor is in a faulty state, as well as to a corresponding device and to a sensor having the device.

15 Claims, 5 Drawing Sheets

(56) References Cited

U.S. PATENT DOCUMENTS

| | | | |
|---|---|---|---|
| 9,581,425 B2* | 2/2017 | Buelau | G01D 11/30 |
| 2008/0294311 A1 | 11/2008 | Henson | |
| 2012/0032768 A1 | 2/2012 | Fox et al. | |
| 2012/0265037 A1* | 10/2012 | Bohm | G01D 18/00 |
| | | | 600/309 |
| 2014/0375331 A1 | 12/2014 | Wingerter | |
| 2015/0142353 A1 | 5/2015 | Cabret et al. | |
| 2016/0209457 A1* | 7/2016 | Lehmann | G01D 5/20 |
| 2017/0016946 A1* | 1/2017 | Reese | G01R 31/2829 |
| 2017/0016948 A1 | 1/2017 | Reese et al. | |

FOREIGN PATENT DOCUMENTS

| | | |
|---|---|---|
| GB | 2043258 A | 10/1980 |
| JP | 2011017563 A | 1/2011 |
| WO | 2012158328 A2 | 11/2012 |
| WO | 2017146877 A1 | 8/2017 |

OTHER PUBLICATIONS

German Search Report for German Application No. 10 2018 213 726.0, dated June 7. 2019 with partial translation, 10 pages.
International Search Report and Written Opinion for International Application No. PCT/EP2019/071625, dated Dec. 3, 2019, 9 pages.
Chinese Office Action for Application No. 201980053754.4, dated Mar. 29, 2022 with translation, 22 pages.

\* cited by examiner

METHOD FOR TESTING A SENSOR

CROSS REFERENCE TO RELATED APPLICATIONS

This application is the U.S. National Phase Application of PCT International Application No. PCT/EP2019/071625, filed Aug. 12, 2019, which claims priority to German Patent Application No. 10 2018 213 725.0, filed Aug. 15, 2018, the contents of such applications being incorporated by reference herein.

FIELD OF THE INVENTION

The invention relates to a method for testing a sensor, to a device for carrying out the method and to the sensor.

BACKGROUND OF THE INVENTION

Sensors are frequently used in safety-critical areas, in particular in the field of motor vehicles, and should therefore be able to maintain their function in unusual states, in particular triggered by mechanical damage, material fatigue, a short circuit or the like, or at least should be able to detect that a faulty state is present.

A known possible way of increasing the safety of sensors is to implement redundancy of components of the sensor which are relevant to the measurement, so that a fault in a component can be compensated by the redundant component. Although this increases the safety in respect of many safety-critical influences on the sensor, it does not deal with other safety-critical influences. It can therefore be the case that faults affect a component and its redundant component in the same way and the safety-increasing effect of the redundancy is cancelled out.

For example, it is conceivable that a sensor has a differential transformer with a primary coil and at least two secondary coils, wherein the secondary coils are influenced by an encoder so that its position is reproduced. In terms of measuring technology it is not possible to differentiate here between at least one point on the measuring range for the sensor and a case in which the encoder has been removed or is inactive. However, a redundant design of the secondary coils does not have an effect on this. There is therefore a need to increase the safety of sensors additionally or by means of an alternative method.

SUMMARY OF THE INVENTION

An aspect of the invention is a method which increases the safety of a sensor and at the same time is robust and requires little expenditure.

According to one aspect of the invention, a method for testing a sensor with a primary inductor which is galvanically isolated from first and second secondary inductors which are respectively coupled inductively to the primary inductor, comprises the steps:

calculating a sensor output signal, wherein the sensor output signal is dependent on the coupling between the primary inductor and the first secondary inductor as well as that between the primary inductor and the second secondary inductor, determining a first electrical variable, in particular of an additional signal, of the sensor, which is different from the sensor output signal, comparing the first electrical variable with a first limiting value in order to determine whether the sensor is in a faulty state.

The electrical variable is to be understood here as being a specific electrical variable which occurs in the sensor, and not, for example, generally in the sense of a differentiation between a voltage and a current. For example, the sensor output signal can be embodied as a voltage, as can also the first electrical variable which is different therefrom, but as a voltage with other tap points. Correspondingly, since the electrical variable is processed as a test variable in the form of a signal, said variable can also be referred to as an additional signal, wherein the additional signal can also be a signal which, when the sensor is operating, would be processed without the specified method for testing a sensor.

Since the first electrical variable is different from the sensor output signal, a situation in which a plausible sensor output signal is obtained despite a faulty state is prevented. The comparison with a limiting value permits precise adaptation to the safety requirement of the sensor, since such a limiting value can be selected and/or programmed randomly.

According to one preferred embodiment, either the primary inductor is fed by an AC generator, wherein the first electrical variable is formed by the absolute value of the, in particular complex-valued, voltage occurring at the primary inductor, or the primary inductor is fed by an AC voltage generator, wherein the first electrical variable is formed by the absolute value of the, in particular complex-valued, current flowing through the primary inductor, or the first electric variable is formed by the sum or the difference between the signals of the first and second secondary inductors.

According to one advantageous embodiment, the method can be carried out in a single sensor for different specified possible electrical variables and/or for different combinations of the specified possible electrical variables. This can be done in chronological succession or in parallel.

A second electrical variable is preferably compared with a second limiting value in order to determine whether the sensor is in a faulty state.

The first electrical variable is preferably formed by the sum of the signals of the first and second secondary inductors, and the second electrical variable is formed by the difference between said signals, or vice versa.

It is preferred that the sensor output signal is used to check the plausibility of the information as to whether the sensor is in a faulty state.

In order to check the plausibility of the state of the sensor it is preferably evaluated whether, within the possible values of the sensor output signal in the measuring range of the sensor, the sensor output signal corresponds to a value from an associated partial range of these values. The determination of a first electrical variable, which is different from the sensor output signal, of the sensor and the comparison of the first electrical variable with a first limiting value is preferably carried out only when the sensor output signal corresponds to a value from the associated partial range.

The partial range preferably includes the center of the measuring range of the sensor, and preferably extends mirror-symmetrically with respect to the center, wherein the partial range in particular takes up less than 40%, preferably less than 30%, of the measuring range.

It is preferred that the limiting value or at least one of the limiting values is formed by a value which is constant over the measuring range of the sensor and lies between the value of the first electric variable in the case of a faulty state and all or the values of the electrical variable which are delimited by the partial range in the case of a non-faulty state.

It is preferred that the respective electrical variable is referred to its maximum possible value within the measuring range of the sensor. The magnitude of this value depends, for example, on the properties of the electrical components of the sensor.

It corresponds to a preferred embodiment that in order to calculate the sensor output signal the signals, in particular voltages, of the first and second secondary inductors are subtracted from one another.

The sensor output signal is preferably calculated in that the AC variables which are subtracted from one another, in particular AC voltages, of the secondary inductors or signals form a further AC variable, in particular an AC voltage, whose amplitude is rectified by means of a phase-sensitive rectifier, or in that the absolute values of the AC variables of the secondary inductors which are subtracted from one another, in particular secondary voltages, or the signals, are divided by the sum of these absolute values.

According to a further aspect of the invention, a device is configured to perform one of the specified methods.

In a development of the specified device, the device comprises a memory and a processor, wherein one of the methods specified is stored in the form of a computer program in the memory, and the processor is designed to execute the method when the computer program is loaded into the processor from the memory.

According to a further aspect of the invention, a sensor comprises an, in particular magnetic, encoder, a primary inductor which is galvanically isolated from first and second secondary inductors which are respectively coupled inductively to the primary inductor, as well as one of the specified devices.

BRIEF DESCRIPTION OF THE DRAWINGS

The above-described characteristics, features and advantages of aspects of this invention and the manner in which they are achieved will become clearer and more distinctly comprehensible in conjunction with the following description of the exemplary embodiments, which will be discussed in more detail in relation to the drawings. In said drawings.

DETAILED DESCRIPTION OF THE PREFERRED EMBODIMENTS

Figure 1:
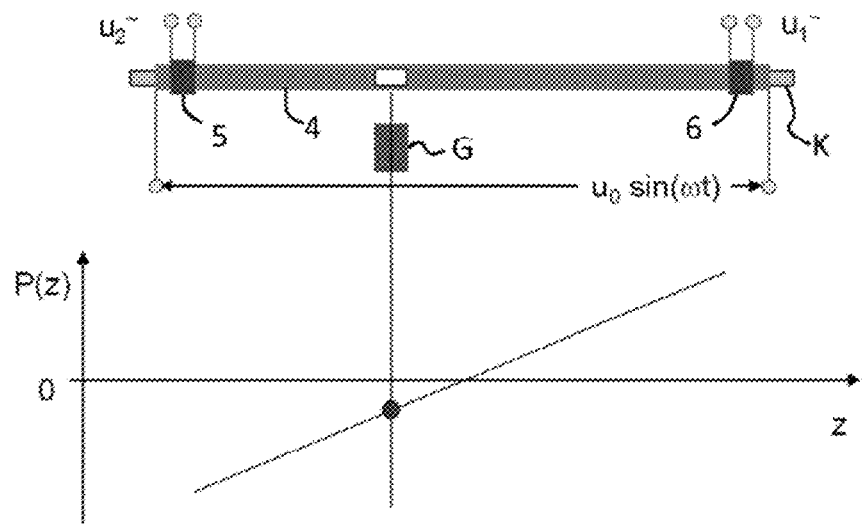
FIG. 1 shows a highly schematic sensor with a differential transformer.

Reference is made to FIG. 1 which represents a sensor by way of example in the form of a differential-transformer position sensor. The latter derives the measurement variable to be determined, the position of an encoder G, from the difference between two signals induced on the secondary side by a primary inductor 4. The primary inductor 4 and secondary inductors 5 and 6 therefore together form a transformer 7. If a permanent magnet is used as an encoder G, its magnetic field ensures there is a saturation zone in the soft-magnetic core material K of the transformer, which zone for its part weights the voltages induced on the secondary side, proportionally in terms of their position. During normal operation, the permanent magnet which is used as a position encoder G therefore changes, as a function of its position above the soft-magnetic magnet core, the amplitude of the voltages induced in the secondary windings 5, 6. The term windings is used here and below as equivalent with the term inductors. If the permanent magnet is located in the mechanical center of the transformer, this is to say at the same distance from the two secondary windings 5, 6, the two secondary voltages are equally large in absolute value and phase, and the resulting difference is zero.

If the permanent magnet is no longer available as a position encoder G in the event of a fault, whether because it is de-magnetized, mechanically destroyed or even has dropped out of its mechanical position guide so that it can no longer act magnetically on the soft-magnetic core, the sensor continues to output a position value which is, however, falsified in this operating situation. Specifically, the two secondary amplitudes of the variables induced in the secondary windings 5, 6 assume virtually identical values, which always results in virtually the center position of the sensor measuring range, irrespective of the evaluation method used for the position.

This state in which the center position is incorrectly output as the sensor output signal, without further fault indication taking place, is to be avoided, in particular, when there are position sensors with relatively high or even the highest safety requirements, since this fault state represents what is referred to as a fault of common origin, in the case of which the sensor, even if it is of redundant design, is not able to indicate the fault state using the position signal as an output variable, since the magnet which has dropped out makes the sensor signal initially appear plausible and correct as a common fault variable.

A suitable test or diagnosis method which displays such defects of the position encoder G so that, for example, an overall system in which the faulty sensor operates as an actual value generator can derive corresponding measures and ensure overall increased safety is provided with the method according to an aspect of the invention. The method will be explained in more detail below by way of example on the basis of two different sensor types.

Figure 2:
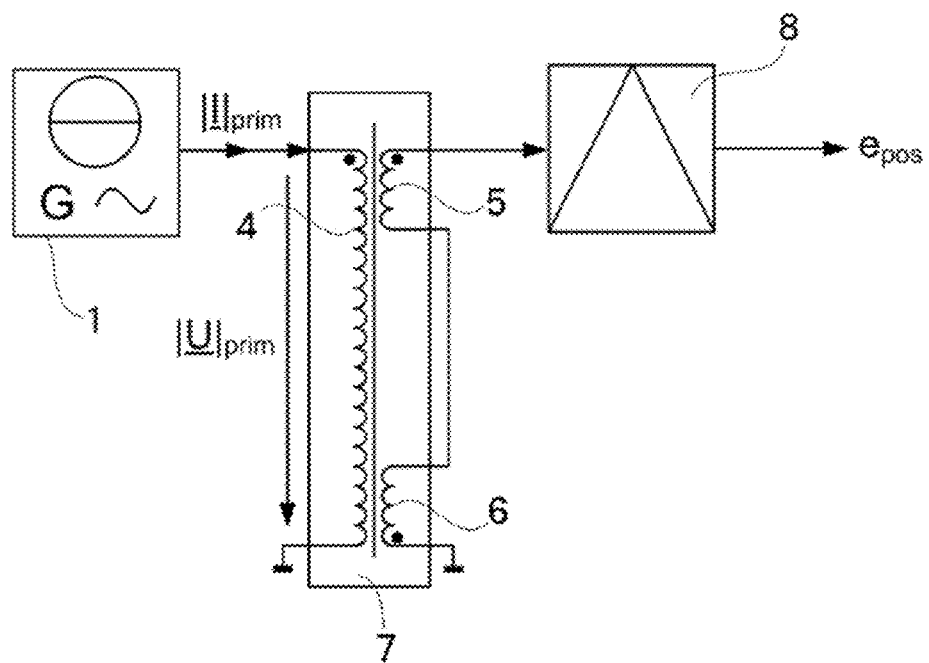
FIG. 2 shows a first exemplary embodiment for implementing the sensor from FIG. 1.
Figure 3:
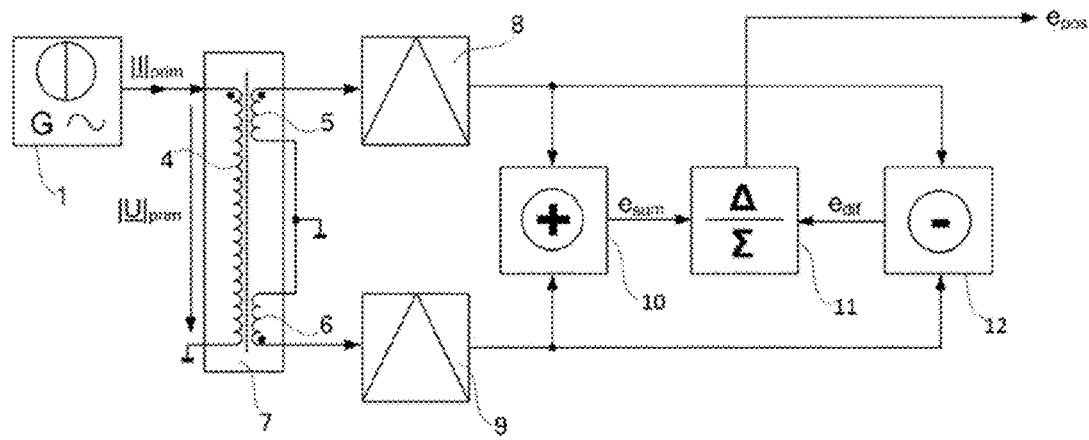
FIG. 3 shows a second exemplary embodiment for implementing the sensor from FIG. 1.

The two sensor types illustrated in FIG. 2 and FIG. 3 correspond to the principle of the differential-transformer position sensor illustrated in FIG. 1.

The position sensor illustrated in FIG. 2, of the type I, is distinguished by simple design and, inter alia, by the fact that this position sensor determines the position using secondary windings which are connected subtractively. The induced AC variable is subtracted by means of the anti-serial connection of the secondary windings 5, 6 while taking into account the winding direction of the respective secondary winding 5, 6, wherein the position information can be determined without errors over the entire measuring range only if the absolute value and phase of the induced secondary signals are taken into account. The AC voltage amplitude which has been obtained subtractively is rectified with an amplitude demodulator 8, which is embodied as a phase-sensitive rectifier which also takes into account the phase component. The actuation signal of the primary winding is generally used as a reference phase position.

In the type I sensor, position-dependent phase faults of the transformer 7 in relation to the reference phase position of the actuation of the primary winding 4 directly influence the accuracy of the position information which is produced as a sensor output signal epos at the output of the demodulator 8.

For a sufficiently linearly extending position characteristic curve, the source which actuates on the primary side should be embodied as a power source with the constant amplitude in the case of the type I sensor. This is to be considered disadvantageous because in comparison with a generator with a constant voltage amplitude the expenditure on circuitry for a constant AC power source generally has to be higher. The direct dependence of the position variable on the absolute amplitude of the current which actuates on the primary side is also disadvantageous. In order to avoid inaccuracies in the position signal, a primary source which is highly stable with respect to the amplitude of the current is necessary. Compensation through a ratio-metric mode of operation is not present in this respect in the type I sensor. Since owing to its simple design the type I sensor makes it virtually impossible to compensate systematic faults occurring during the measuring process, it should only be used for simpler applications with less stringent demands.

Position sensors of the type II, as illustrated in FIG. 3, differ primarily from the above-mentioned type I sensor in the way in which the secondary signals are evaluated. Two amplitude demodulators 8, 9 are used which form, in a selective fashion for each secondary winding 5, 6, the absolute value of the AC voltage which is induced in the secondary winding 5, 6. The phase information can be dispensed with. The further processing of the absolute values which are obtained for the secondary amplitudes relating to the position information is done by applying the arithmetic operations of a difference formation operation 12 and a sum formation operation 10. Finally, the position signal epos is obtained with the formation of the quotient 11 from the differential signal edif and the sum signal esum. The signal processing often takes place in a purely digital fashion starting from the inputs of the amplitude demodulators 8, 9. As a result, type II position sensors are particularly low in drifting when changes occur in the ambient temperature and are additionally particularly stable over the long term. Increased expenditure with the type II sensor also includes further advantages:

An easy-to-configure AC voltage generator with a preferably constant amplitude can be used as an actuation signal source 1 of the primary winding without disadvantages. This is possible because with the quotient formation operation 11 standardization to the sum amplitude is performed for each individual measuring point on the position axis. This provides the advantages that the primary amplitude can no longer have any influence on the position value epos which is obtained. In addition, the applied standardization method contributes to significant characteristic curve linearization despite the primary voltage source which is used.

With the esum and edif variables, not only is the position information available but also further variables which can be used for diagnostic purposes, without entailing additional costs.

Since type II sensors are independent of the absolute primary amplitude and of the non-evaluated phase information and therefore also cannot make an incorrect contribution, such sensors are suitable for applications with relatively stringent requirements.

Below, an explanation will be given for the respective sensor types I and II as to how the method according to an aspect of the invention can be used to increase the safety of the sensor and, in particular, to overcome the problem described in conjunction with FIG. 1.

Figure 4:
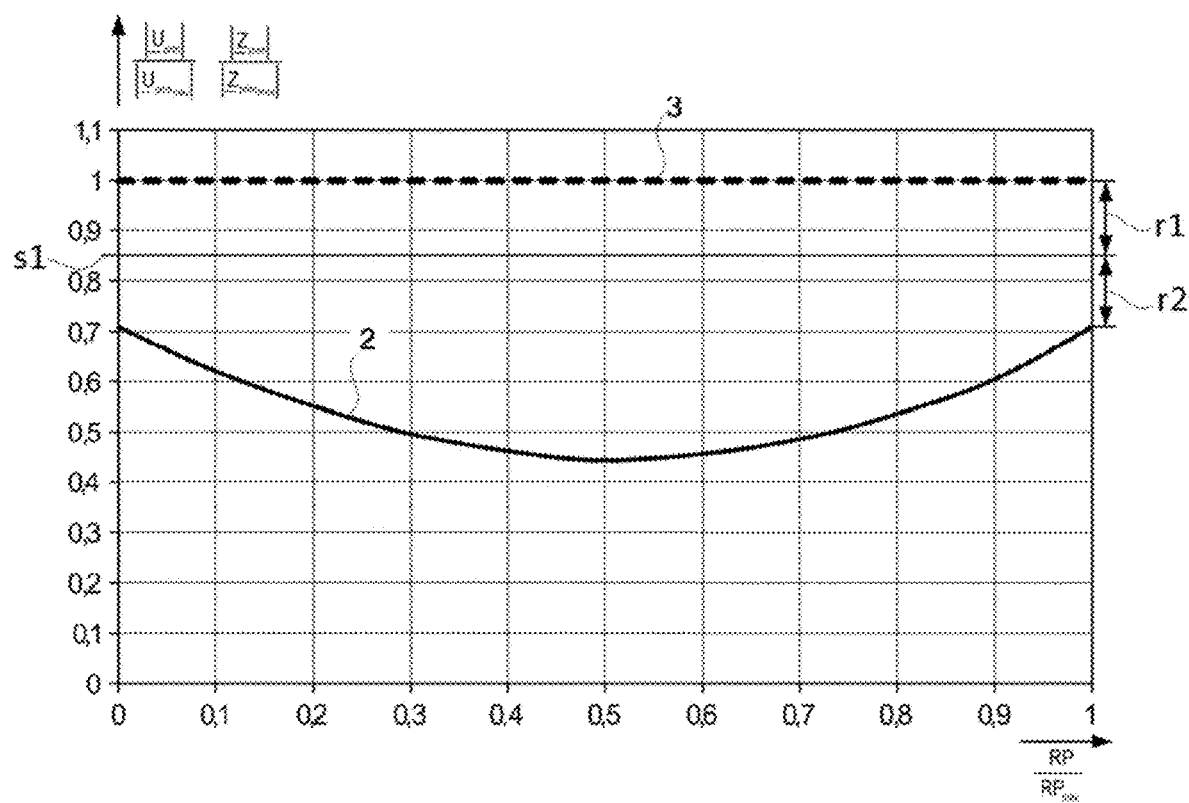
FIG. 4 shows a diagram which represents the profile of an electrical variable, used in an exemplary embodiment of the method according to the invention, over the measuring range of the sensor.

Reference is made to FIG. 4. A type I position sensor according to FIG. 2 has, in its basic form, just one output variable—the sensor output signal epos which represents the position of the encoder G. Since this position signal is not sufficient alone to detect the fault state because in the case of a fault with the center position the epos variable epos assumes a value which is part of the value range during normal, fault-free operation, according to an aspect of the invention at least one variable which is influenced by the fault state is to be used, which variable then permits an unambiguous statement to be made about the fault state, if appropriate in conjunction with the position signal as an auxiliary variable.

In the case of the type I position sensor which is fed with a current of constant amplitude, the absolute value of the complex-valued voltage |Uprim| which occurs at the primary winding forms such an electrical variable which can be used to test the sensor. In the case of constant current, said variable assumes a deterministic profile during normal, therefore fault-free operation, and also has, above all, a significantly different (functional) value in the case of the fault because the voltage |Uprim| is then in fact at a maximum, wherein the maximum value is not reached during normal operation. These differences in the voltage |Uprim| between fault-free operation and faulty operation create the precondition for suitable detection of a case of a fault.

The typical functional profile of the variables which are produced is shown in FIG. 4 with the standardized primary voltage, detected at a transformer, as a function of the standardized reference position for the normal fault-free operation 2, and the functional profile in the case of a defective magnet, therefore one which is missing in this example, is shown by dashes as a position encoder G in the functional profile 3. When the current is constant, the voltage profile 2, 3 can be derived from the apparent impedance of the transformer, wherein in this example magnetisation energy of the primary conductor can be primarily applied, since the transformer is to be operated without a load on the secondary side. When there is a constant current and the illustration is standardized, the impedance profile is identical to the voltage profile and is also indicated in FIG. 4. The standardized illustration serves to facilitate comparison with the characteristic curve diagrams which are also indicated below.

The test method for the type I position sensor can then be implemented in that the magnitude of the absolute value of the voltage at the primary winding |Uprim| is firstly detected with a value comparator or voltage comparator and compared with a limiting value. For this purpose, for example the limiting value s1 has been used as a decision-maker threshold in FIG. 4 for the provision of the limiting value for the voltage comparator for which the following applies with respect to the fault state:

If the absolute value of the standardized voltage is higher than the limiting value s1 of the decision-maker threshold, the type I sensor system is in the fault state.

If the absolute value of the standardized voltage is lower than the limiting value s1 of the decision-maker threshold, the type I sensor system is in the normal fault-free operating state.

The safety interval of the standardized primary voltage with respect to a fault display which fails to occur despite a fault state is specified with the diagnostic reserve r1 in FIG. 4. The safety interval of the standardized primary voltage with respect to a fault display despite normal operation is correspondingly specified with the diagnostic reserve r2. For the method to have a mode of operation which is as robust as possible, the diagnostic reserves r1, r2 should both be as large as possible. However, since both variables behave inversely with respect to one another, a compromise always has to be made here.

However, a significant increase in both diagnostic reserves r1, r2 from FIG. 4 and therefore a significantly more robust mode of operation can be achieved with a similar, but expanded, diagnostic method, in that the sensor output signal epos which specifies the position to be detected is used as a further plausibility-checking information item. The knowledge that in the event of a fault, the sensor output signal epos virtually always displays the central position of the entire measuring range in the fault states being dealt with here, the range in FIG. 4 for which the decision-maker threshold is active or is switched to sensitive, can be narrowed down to values of the sensor output signal which are in the center of the measuring range, supplemented by positive and negative tolerances, wherein the following is to apply:

$$epos = \frac{RP}{RP_{max}}$$

Figure 5:
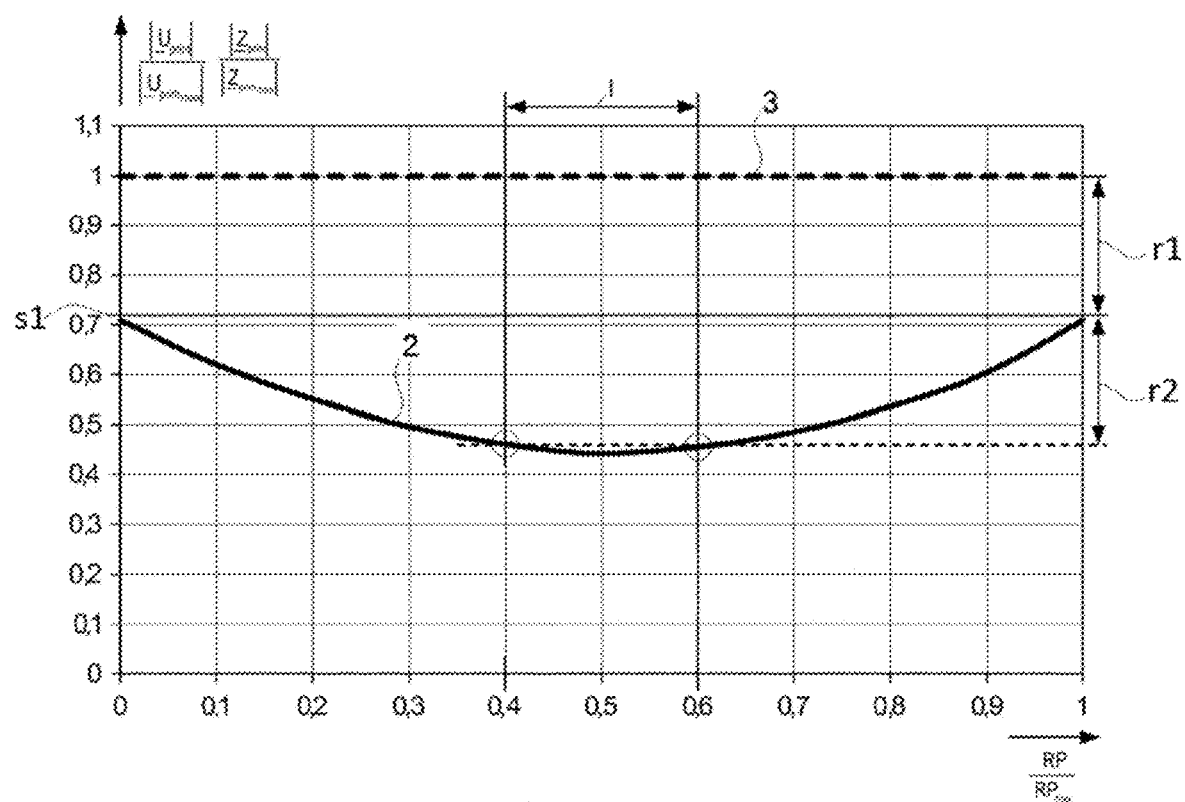
FIG. 5 shows a diagram according to the exemplary embodiment illustrated in FIG. 4, wherein the sensor output signal is used for plausibility checking.

This is illustrated in FIG. 5. Under conditions which are otherwise the same as before, the partial range I characterises the interval or the value range for which the voltage comparator of the standardized voltage is exclusively switched to active and can cause a fault state to be displayed. The fault display of the corresponding device of the sensor, or diagnostic apparatus, is inactive for the other position ranges of the sensor output signal epos outside the partial range I. The positive consequence of this method is clarified graphically in FIG. 5: By reducing the diagnostic range from the entire measuring range of the sensor, therefore $$epos = \frac{RP}{RP_{max}} \in [0; 1]$$

to the limited partial range of $$epos = \frac{RP}{RP_{max}} \in [0, 4; 0, 6]$$

the limiting value s1 can be significantly lowered without the diagnostic reserve r2 being adversely affected. This is attributable to the fact that the lower limit of the diagnostic reserve r2 is no longer determined by the highest functional value of the standardized primary voltage but rather now by the highest functional values within the interval of the sensor output signal which is specified by the partial range I. Said values are significantly lower in terms of their absolute values and are formed by the intersection points of the primary voltage function with the vertical boundaries of the partial range. In FIG. 5 these intersection points are represented surrounded by a circle.

With respect to the detection as to whether the sensor is in a faulty state, the following applies to the limiting value s1 which is illustrated in FIG. 5:

If the sensor output signal epos is within the partial range I and the absolute value of the standardized voltage is higher than the limiting value s1, the sensor is in the faulty state.

If the sensor output signal epos is within the partial range I and the absolute value of the standardized voltage is lower than the limiting value s1, the sensor is in the normal, fault-free state.

Since the sensor output signal epos is used to check the plausibility of the information as to whether the sensor is in a faulty state, the two diagnostic reserves r1, r2 have become significantly larger than the variables obtained in FIG. 4, which results in an increase in the robustness of the diagnostic method.

The exemplary embodiments of the position sensor type I described above always require additional expenditure on circuitry for the acquisition of the test variable |Uprim|. The exemplary embodiments relating to the position sensor type II which are described below have the advantage that this additional expenditure is for the most part avoided.

Owing to the more complex and discreet design of the type II position sensor according to FIG. 3, it basically has a greater variety of plausibility-checking possibilities than the type I sensor. Nevertheless, in the first instance, similar diagnostic methods to those from before will be disclosed in further exemplary embodiments, but with adaptation to the system design of the type II sensor, these methods requiring an external circuit periphery, similarly to type I.

On the primary side, the position sensor type I differs from the type II sensor mainly in respect of the supply source. It is therefore obvious to devise similar methods for diagnosing a position encoder defect to those which have already been presented for the type I sensor, but with adaptation to the supply source of the type II sensor, which source is represented by the AC voltage source 1 with a constant amplitude from FIG. 3. If in the first instance it is also assumed, as in the case of the type II sensor that just one output variable, the sensor output signal epos, is available, this signal alone is also not sufficient here to detect the fault state caused by a defective position encoder G. In the case of a fault with the center position, in the type II sensor the variable epos assumes a value which is part of the value range in the normal, fault-free operation so that the variable epos is eliminated solely for plausibility checking purposes.

In the diagnostic methods which are presented below, further variables which are influenced by the fault state will be used again, said variables then permitting, in conjunction with the position signal as an auxiliary variable, an unambiguous statement about the fault state. In the type II position sensor which is supplied with a voltage with the constant amplitude, this additional possibility-checking variable arises, for example, with the absolute value of the complex-valued current |Iprim| which flows through the primary winding and, when the voltage is constant, assumes a deterministic profile in the normal, that is to say fault-free, operation, and has a significantly different (functional) value in the event of a fault, because the current |Iprim| is then in fact namely minimal, wherein the minimum value is not reached during normal operation. These differences of the current |Iprim| between fault-free operation and faulty operation provide the precondition for a suitable plausibility-checking possibility of the fault situation with a type II sensor.

Figure 6:
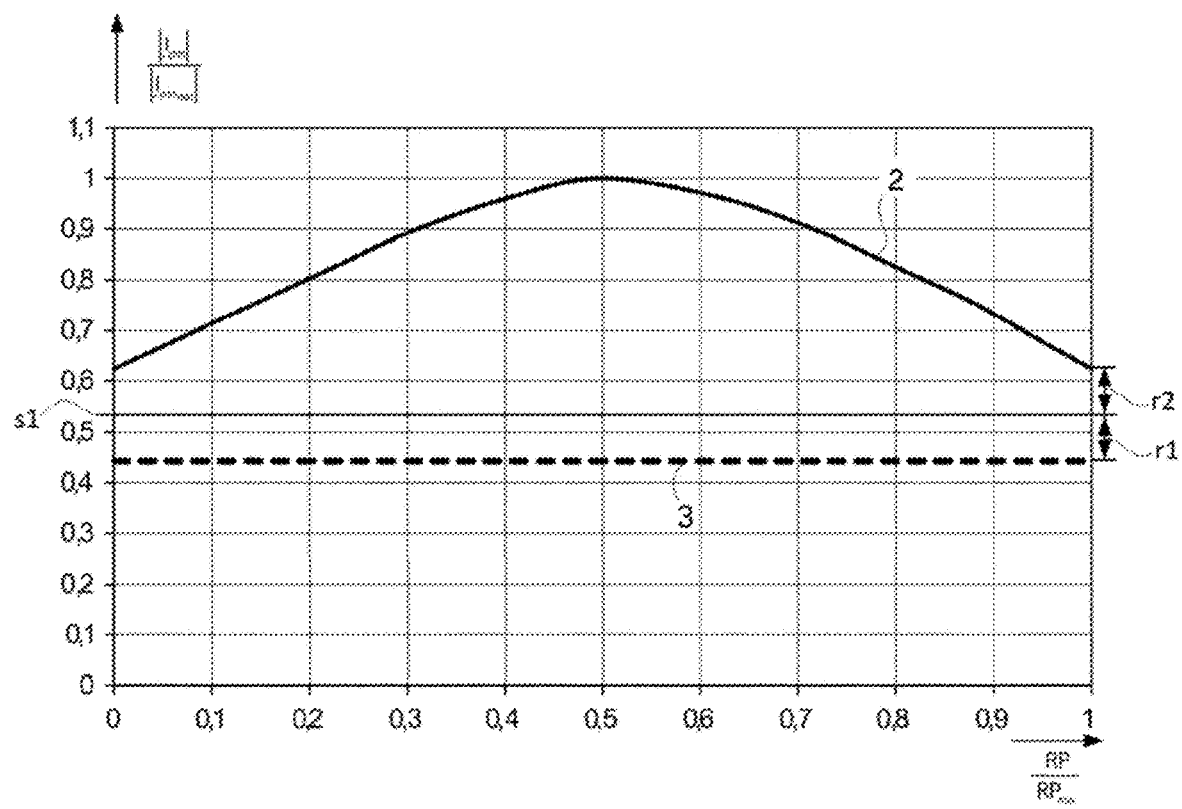
FIG. 6 shows a diagram which represents the profile of an electrical variable, used in a further exemplary embodiment of the method according to the invention, over the measuring range of the sensor.

The typical functional profile of the variables which are obtained is shown by FIG. 6 with the standardized primary current, detected at the transformer, as a function of the standardized reference position for the normal, fault-free operation 2, as well as the functional profile 3 in the case of a defective sensor, therefore in this example when a magnet is missing as the position encoder G. The standardized illustration serves again to permit a simplified comparison with the characteristic curve diagrams given below. The diagnostic apparatus for the type II position sensor can then be implemented in a way analogous to the type I sensor in that the magnitude of the absolute value of the current through the primary winding |Iprim| is firstly detected with a value comparator or current comparator and compared with a limiting value s1. This purpose, for example the limiting value s1 has been used as a decision-maker threshold in FIG. 6 for the provision of the limiting value for the current comparator, for which the following applies with respect to the detection of a fault state:

If the absolute value of the standardized current is greater than the limiting value s1, the sensor is in the normal, fault-free operating state.

If the absolute value of the standardized current is lower than the limiting value s1, the sensor is in the faulty state.

The diagnostic reserve r2 in FIG. 6 is in turn used to indicate the safety interval of the standardized primary current with respect to a fault display despite the occurrence of normal operation. The diagnostic reserve r1 is correspondingly used to indicate the safety interval of the standardized primary current with respect to a fault display which fails to occur despite a fault state. For the method to have a mode of operation which is as robust as possible, the diagnostic reserves r2, r1 should both in turn be as large as possible. Both variables once more behave inversely with respect to one another and a compromise has to be made again in respect of the position of the decision-maker threshold in the form of the limiting value s1.

Figure 7:
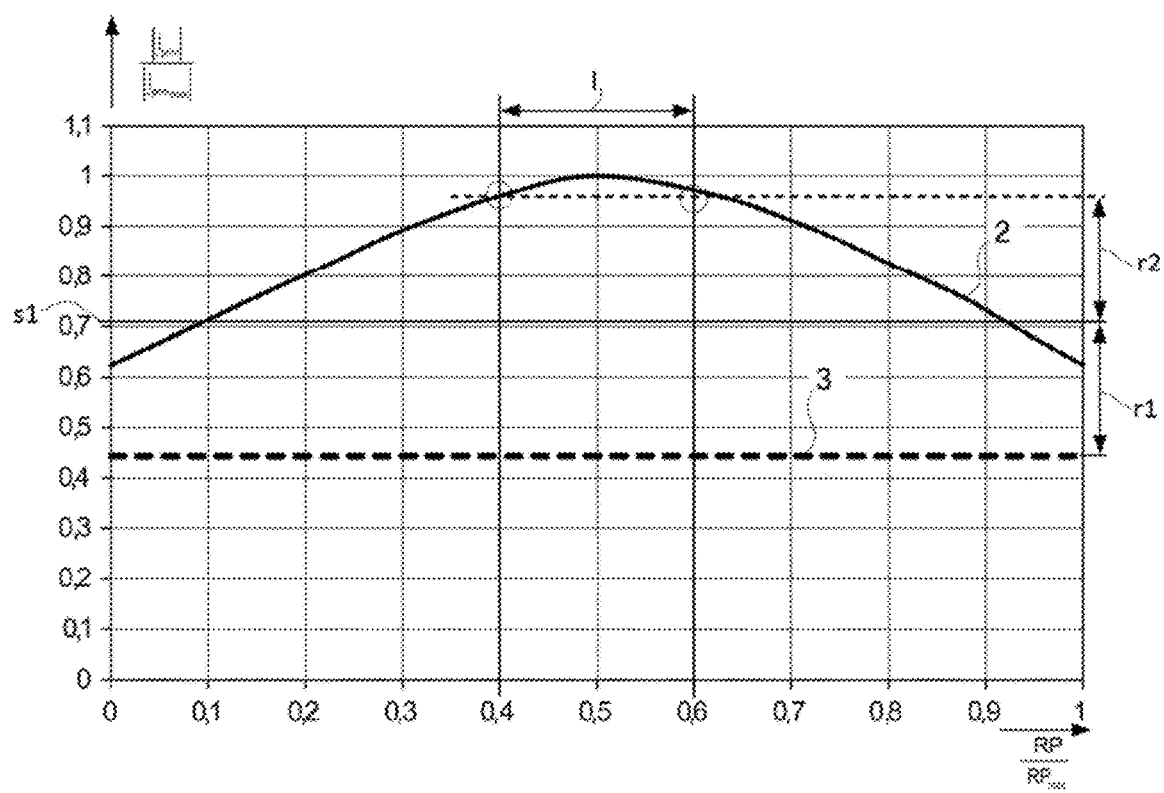
FIG. 7 shows a diagram according to the exemplary embodiment illustrated in FIG. 6, wherein the sensor output signal is used for plausibility checking.

With the type II sensor it is also possible to make the two diagnostic reserves r2, r1 larger, and therefore bring about a more robust mode of operation, in comparison with the exemplary embodiment in FIG. 6, in that in addition to the absolute value of the current |Iprim| flowing through the primary inductor, the sensor output signal epos is in turn additionally used as further possibility-checking information. The knowledge that in the event of a fault, the sensor output signal epos virtually always displays the central position of the entire measuring range in the fault states being dealt with here, the range for which the decision-maker threshold is active or is switched to sensitive, can be narrowed down to values of the sensor output signal epos which are in the center of the measuring range, supplemented by positive and negative tolerances. This is illustrated in FIG. 7.

Under conditions which are otherwise the same as before, the partial range I characterizes the value range for which the current comparator of the standardized current is exclusively switched to active and can cause a fault state to be displayed. For the other position ranges of epos outside the partial range I, the fault display of the diagnostic apparatus is inactive. The positive consequence of this development is made clear in a graphic fashion in FIG. 7. By reducing the diagnostic range from the entire position measuring range of the sensor to the limited partial range, which already makes up 20% of the measuring range in the exemplary embodiment in FIG. 5, the decision-maker threshold which is determined by the limiting value s1 can be significantly raised without the diagnostic reserve r2 being adversely affected thereby. This is attributable to the fact that the upper limit of the diagnostic reserve r2 is now no longer determined by the lowest functional value of the standardized primary current but rather by the lowest functional values within the partial range I. These values are significantly higher in terms of their absolute values, and are formed by the intersection points of the primary current function with the vertical boundaries of the partial range I. In FIG. 7 these intersection points are represented surrounded by a circle.

With the limiting value s1 the following applies with respect to the assessment as to whether a faulty state is present:

If the sensor output signal epos is within the partial range I and the absolute value of the standardized current is higher than the limiting value s1, the sensor is in the normal, fault-free state.

If the sensor output signal epos is within the partial range I and the absolute value of the standardized current is lower than the limiting value s1, the sensor is in a faulty state.

Since the sensor output signal epos is used to check the plausibility of the information as to whether the sensor is in a faulty state, the two diagnostic reserves r1, r2 have become significantly larger than the variables obtained in FIG. 6, which results in an increase in the robustness of the diagnostic method.

The exemplary embodiments described above always require significant additional expenditure on circuitry to detect the test variable or diagnostic variable, that is to say the primary current |Iprim| or the primary voltage |Uprim|, which results in additional costs. These additional costs which are disadvantageous from the economic point of view can at least be largely avoided with the type II sensor by having recourse to the discrete signals esum, edif and/or epos, represented in FIG. 3, occurring in the profile of the secondary signal processing operation, as plausibility-checking variables. Two exemplary embodiments of the various combination possibilities of the discrete secondary signals with respect to one another will be explained below.

The sum signal esum and the differential signal edif are available as discrete variables in the signal processing operation of the type II sensor for the determination of the position value epos. In particular in the case of digital processing of these variables, their further processing can be implemented within the scope of a diagnostic method of a position encoder defect without additional costs. An exemplary embodiment of a method for testing a sensor which, even though it can be implemented with low expenditure and in a cost-neutral fashion, can provide similar properties to the methods in the previously specified exemplary embodiments, will be presented below with reference to FIG. 8, initially using the discrete variables esum and edif.

Figure 8:
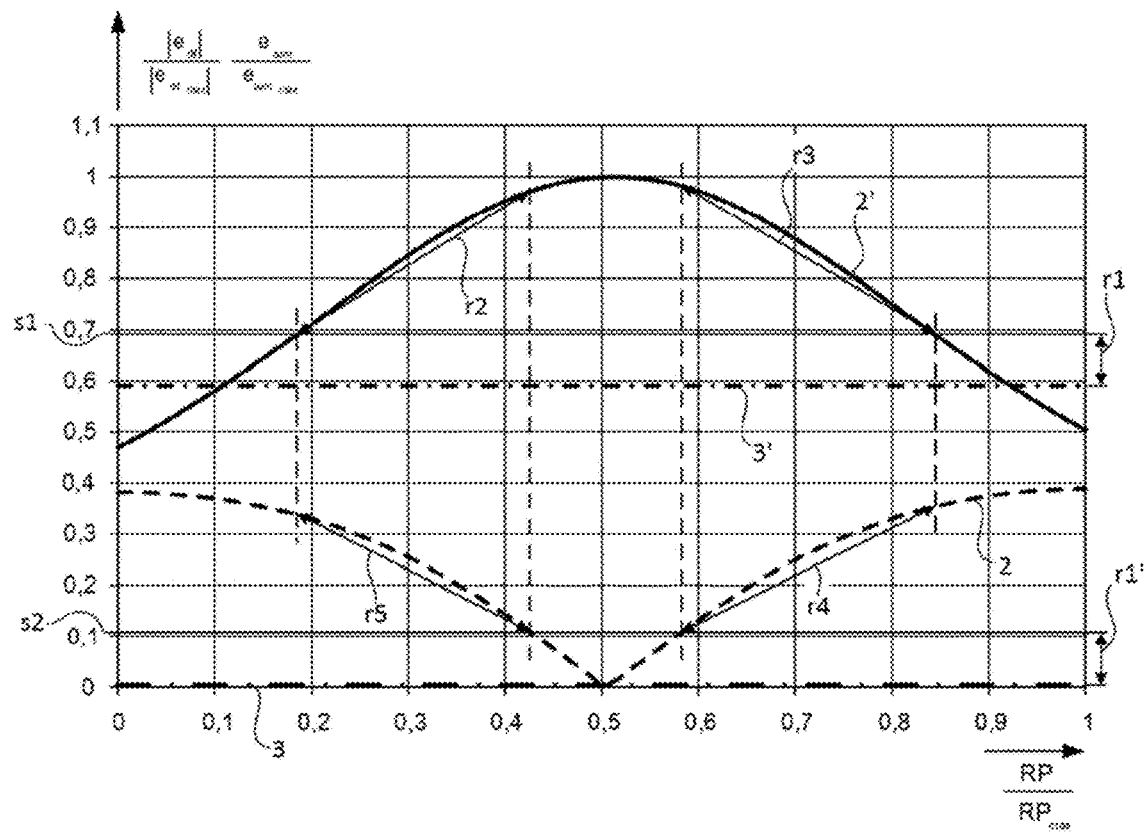
FIG. 8 shows a diagram which represents the profile of two electrical variables, used in a further exemplary embodiment of the method according to the invention, over the measuring range of the sensor.

In this respect, the functional profiles in the characteristic curve diagram in FIG. 8 are provided by way of example $$\frac{|e_{dif}|}{|e_{dif_{max}}|} = f\left(\frac{RP}{RP_{max}}\right)$$

both of the normal, fault-free operating situation 2 and of the fault state 3 of the defective position encoder G, and $$\frac{|e_{sum}|}{|e_{sum_{max}}|} = f\left(\frac{RP}{RP_{max}}\right)$$

are also represented for the normal operating situation 2' and the fault state 3'. The functional profiles represent the typical behavior of this sensor type, wherein the fault state in this example is brought about as a result of the removal of the position encoder magnet. The standardized representation serves again to facilitate comparison with the graphs of the other characteristic curve diagrams represented here.

The method which is based on the variables esum and edif can then be implemented by virtue of the fact that the standardized sum signal relating to the variable of the absolute value is compared with a limiting value s1 using a value comparator, and in a further step such a value comparison is performed with a further, independent limiting value s2 for the standardized differential signal. With a case differentiation it is then possible to determine in a following step whether both variables, the standardized sum signal and the standardized differential signal, are lower than the respective limiting value s1, s2. This configuration is then the indicator for a defective position encoder G. All the other configurations relating to the respective limiting values s1, s2 then indicate normal, fault-free operation of the sensor.

In summary, the following principles can be obtained by way of example with the two limiting values s1, s2 in FIG. 8, which are defined as decision-maker thresholds, and the functional profiles, for determining whether the sensor is in a faulty state:

If the standardized absolute value of the sum signal esum is lower than its associated limiting value s1, and the standardized absolute value of the differential signal edif is lower than its associated limiting value s2, the sensor is in a faulty state.

If the standardized absolute value of the sum signal esum and the standardized absolute value of the differential signal edif are in a different state, in terms of their respective limiting values s1, s2 than that mentioned above, the sensor is in the normal, fault-free state.

In the exemplary embodiment in FIG. 8, owing to the case differentiation which is applied, the diagnostic reserves represent something different than in the exemplary embodiments mentioned above.

The safety interval of the absolute value of the standardized sum signal and the safety interval of the absolute value of the standardized differential signal with respect to a fault display which has failed to occur despite a fault state of the sensor are specified with the diagnostic reserve r1 and r1' in FIG. 8. The diagnostic reserves r1 and r1' are equivalent at this point, since any individual reserve determines how reliably it is possible to prevent the failure of a fault display despite a fault state having occurred.

The diagnostic reserve, by means of which the safety interval with respect to a fault display can be indicated despite normal operation, is determined on the basis of geometric dependencies in this diagnostic method. In this context, as is apparent from FIG. 8, the shortest distance between the four straight sections r2, r3, r4, r5, is determined by the magnitude of the reserve with respect to a fault display despite normal operation. Since the length of the straight sections r2, r3, r4, r5 is linked in geometrically inverse fashion to the diagnostic reserves r1 and r1', the aim here must also be to arrive at a compromise between the reserve of a fault display despite normal operation, or the reserve with respect to the failure of a fault display to occur despite a fault state of the sensor. The dimensioning of the diagnostic reserves in the exemplary embodiment in FIG. 8 has occurred here in a clearly asymmetrical fashion, wherein the emphasis has been placed on a large reserve with respect to a fault display despite normal operation.

Among the discrete secondary signals in the case of the type II position sensor, the sum signal esum is also suitable as an electrical variable which is used for testing, wherein plausibility checking is carried out in conjunction with the sensor output signal epos, which represents the position detected by the sensor. This exemplary embodiment becomes clear from FIG. 9. The sum signal esum also represents a cost-neutral variable which can be used without additional material expenditure. Similarly to what is shown in conjunction with FIGS. 5 and 7, in this case also the sensor output signal is, as it were, not to be processed completely as such, but rather again the knowledge is sufficient that in the event of a fault in the fault states dealt with here the sensor output signal epos always virtually indicates the central position of the entire measuring range, in order to obtain an unambiguous differentiation criterion for the diagnostic method. It becomes clear from the functional profile 2 for the standardized sum signal 2 during normal operation and the functional profile 3 in the fault state of the sensor in FIG. 9 that the sensor output signal epos not only constitutes at this point additional information for the acquisition of the largest possible diagnostic reserves, but it also prevents incorrect diagnoses occurring systematically at the edge areas of the measuring range. This becomes clear from the profile of the standardized sum signal 2 during normal operation of the sensor in comparison with the standardized sum signal in the fault state 3. Both functions have common functional values in the measuring range of the sensor, or intersect so that there is no possibility of unambiguous differentiation over the entire measuring range. However, an unambiguous differentiation criterion is possible by limiting the test method to the partial range I, because the values of the two functional profiles 2, 3 are always unequal in this limited interval.

With the limitation to the partial range I and the definition of a suitable limiting value s1 as the decision-maker threshold it is possible to differentiate the operating states of the sensor as follows:

If the sensor output signal epos is within the partial range I and the standardized sum signal esum is higher than the limiting value s1, the sensor is in the normal, fault-free state.

If the sensor output signal epos is within the partial range I and the standardized sum signal esum is lower than the limiting value s1, the sensor is in a faulty state.

Thanks to the limitation of the position interval to the partial range I, the upper limit of the diagnostic reserve r2 is also determined again at this point by the lowest functional values within the limited position interval. These values, again illustrated surrounded by circles, are determined from the intersection points of the standardized sum signal esum with the vertical boundaries of the partial range I.

Figure 9:
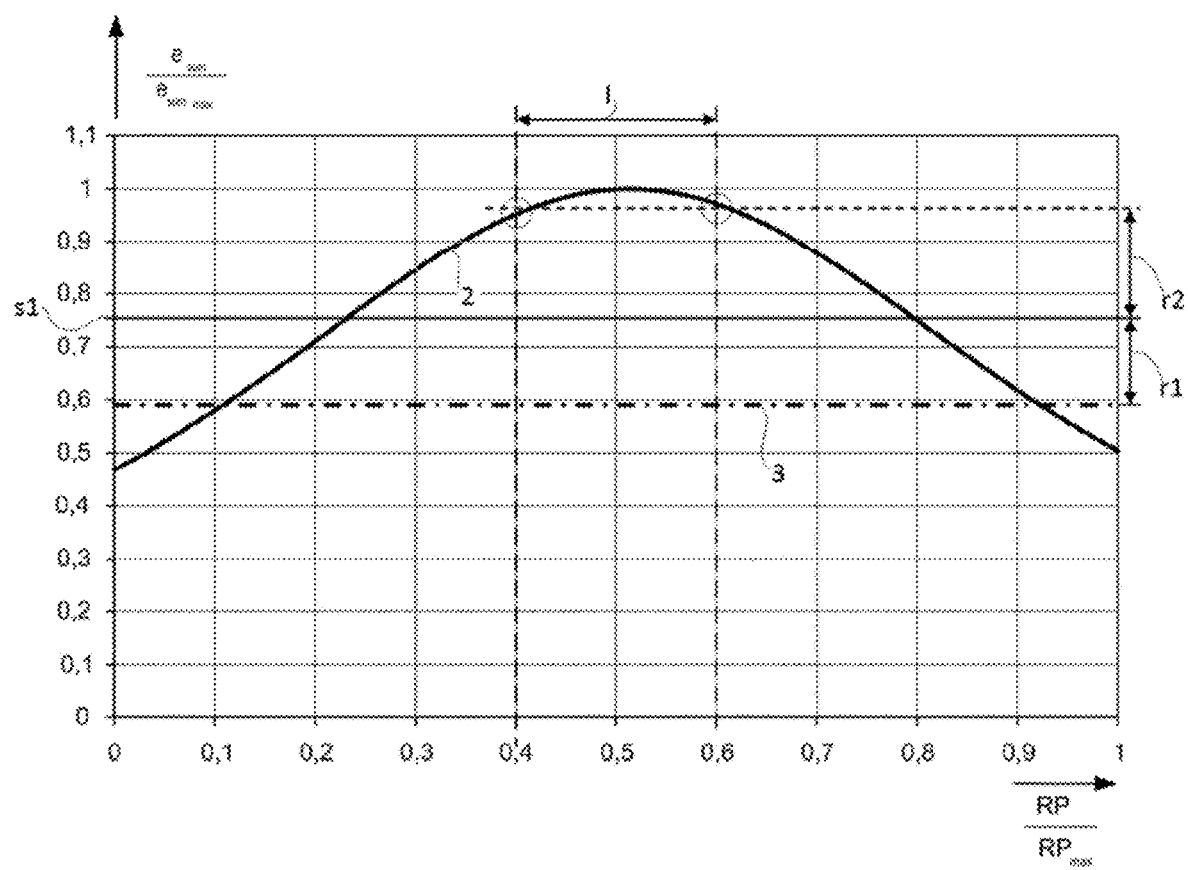
FIG. 9 shows a diagram which represents the profile of an electrical variable, used in a further exemplary embodiment of the method according to the invention, over the measuring range of the sensor, wherein the sensor output signal is used for plausibility checking.

As a result, the diagnostic reserve r2 in FIG. 9 provides a safety interval, which is more than sufficient in practice, for the standardized sum signal with respect to the limiting value s1 and therefore also with respect to a fault display despite normal operation. The diagnostic reserve r1 is correspondingly used to indicate the safety interval of the standardized sum signal with respect to a fault display which fails to occur despite a fault state. For the method to have a mode of operation which is as robust as possible, the diagnostic reserves r1 and r2 should both in turn be as large as possible. Both variables also behave inversely with respect to another in this exemplary embodiment, and therefore a compromise has to be arrived at with respect to the definition of the limiting value s1.

The invention claimed is:

1. A method for testing a sensor with a primary inductor which is galvanically isolated from first and second secondary inductors which are respectively coupled inductively to the primary inductor, comprising:
   calculating a sensor output signal from the secondary inductor, wherein the sensor output signal is dependent on a coupling between the primary inductor and the first secondary inductor as well as that between the primary inductor and the second secondary inductor; and
   determining whether the sensor is operating in a faulty state by:
      applying a constant current signal to the primary inductor and determining a first electrical variable, by measuring a voltage across the primary inductor; and
      comparing the first electrical variable with a first limiting value, the first limiting value being a threshold amplitude that is between a normal amplitude of the measured voltage when the sensor is operating in a normal state, and a fault amplitude of the measured voltage when the sensor is operating in the faulty state.

2. The method as claimed in claim 1, wherein the primary inductor is fed by an AC generator, wherein the first electrical variable is formed by an absolute value of the voltage occurring at the primary inductor, or
   wherein the primary inductor is fed by an AC voltage generator, wherein the first electrical variable is formed by an absolute value of the current flowing through the primary inductor, or
   the first electric variable is formed by a sum or a difference between the signals of the first and second secondary inductors.

3. The method as claimed in claim 1, wherein a second electrical variable is compared with a second limiting value in order to determine whether the sensor is in a faulty state.

4. The method as claimed in claim 3, wherein the first electrical variable is formed by the sum of the signals of the first and second secondary inductors, and the second electrical variable is formed by the difference between said signals, or vice versa.

5. The method as claimed in claim 1, wherein the sensor output signal is used to check the plausibility of the information as to whether the sensor is in a faulty state.

6. The method as claimed in claim 5, wherein in order to check the plausibility of the state of the sensor it is evaluated whether, within the possible values of the sensor output signal in a measuring range of the sensor, the sensor output signal corresponds to a value from an associated partial range of these values.

7. The method as claimed in claim 6, wherein the partial range includes the center of the measuring range of the sensor, and preferably extends mirror-symmetrically with respect to the centre, wherein the partial range in particular takes up less than 40%, preferably less than 30%, of the measuring range.

8. A method for testing a sensor with a primary inductor which is galvanically isolated from first and second secondary inductors which are respectively coupled inductively to the primary inductor, comprising:
   calculating a sensor output signal, wherein the sensor output signal is dependent on a coupling between the primary inductor and the first secondary inductor as well as that between the primary inductor and the second secondary inductor,
   determining a first electrical variable, of an additional signal of the sensor, which is different from the sensor output signal, and
   comparing the first electrical variable with a first limiting value in order to determine whether the sensor is in a faulty state,
   wherein the first limiting value of at least one of the limiting values is formed by a value which is constant over the measuring range of the sensor and which lies between the value of the first electric variable in the case of a faulty state and all or the values of the electrical variable which are delimited by the partial range in the case of a non-faulty state.

9. The method as claimed in claim 1, wherein the respective electrical variable is related to its maximum possible value within the measuring range of the sensor.

10. The method as claimed in claim 1, wherein, in order to calculate the sensor output signal the signals of the first and second secondary inductors are subtracted from one another.

11. The method as claimed in claim 10, wherein the sensor output signal is calculated in that the signals which are subtracted from one another form an AC voltage whose amplitude is rectified by means of a phase-sensitive rectifier, or in that the signals which are subtracted from one another are divided by their sum.

12. A device for carrying out a method as claimed in claim 1.

13. A device comprising a memory and a processor, wherein the method as claimed in claim 1 stored in the form of a computer program in the memory, and the processor is designed to execute the method when the computer program is loaded into the processor from the memory.

14. A sensor comprising encoder, a primary inductor, which is galvanically isolated from first and second secondary inductors, and a device as claimed in claim 12.

15. A sensor comprising encoder, a primary inductor, which is galvanically isolated from first and second secondary inductors, and a sensor as claimed in claim 13.

* * * * *